United States Patent Office 3,654,228
Patented Apr. 4, 1972

3,654,228
PROCESS FOR THE PREPARATION OF
POLYOXYMETHYLENE
Shin'ichi Ishida, Tokyo, Noboru Ohshima, Saitama-ken, Norimasa Fujita and Kyoichiro Mori, Kanagawa-ken, Kunio Kurita and Hayashi Ohki, Tokyo, Kunio Sato, Kanagawa-ken, Kazuo Nagamatsu, Tokyo, and Akira Tokushige, Kanagawa-ken, Japan, assignors to Asahi Kasei Kogyo Kabushiki Kaisha, Osaka, Japan
Filed Sept. 10, 1969, Ser. No. 856,741
Claims priority, application Japan, Sept. 11, 1968, 43/65,106, 43/65,107
Int. Cl. C08g 1/02
U.S. Cl. 260—67 FP                                       9 Claims

ABSTRACT OF THE DISCLOSURE

Process for polymerizing formaldehyde which comprises blowing a gas stream comprising gaseous formaldehyde into a liquid polymerization medium below the liquid level thereof in such a depth that no unreacted gas appears above the liquid level, said polymerization medium containing a catalyst selected from the group consisting of (1) tetravalent organotin compounds of the general formula, $$R_mSnF_{4-m}$$

wherein $m$ is an integer of from 1 to 3, R which may be the same or different represents alkyl, alkenyl, aryl and aralkyl groups having from 1 to 20 carbon atoms, whose one or more hydrogen atoms may be substituted by a member selected from the group consisting of hydroxy, carbonyl, ester, nitro, cyano, ether groups and halogen, and Y which may be the same or different represents groups of the general formulae,

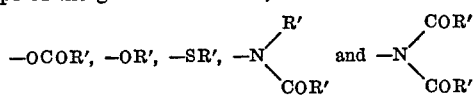

wherein R' has the same meaning as R defined above, however, when Y is the group

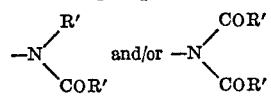

$m$ is not 1, (2) tetravalent organotin compounds of the general formula,

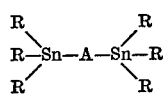

wherein R which may be the same or different represents alkyl, alkenyl, aryl and aralkyl groups having from 1 to 20 carbon atoms, whose one or more hydrogen atoms may be substituted by a member selected from the group consisting of hydroxy, carbonyl, ester, nitro, cyano and ether groups and halogen, and A represents a member selected from the group consisting of oxygen, sulfur atom and a group of the formula,

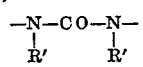

wherein R' has the same meaning as R defined above, (3) tetravalent organotin compounds of the general formula,

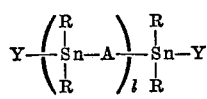

wherein $l$ is an integer of from 1 to 100, R which may be the same or different represents alkyl, alkenyl, aryl and aralkyl groups having from 1 to 20 carbon atoms, whose one or more hydrogen atoms may be substituted by a member selected from the group consisting of hydroxy, carbonyl, ester, nitro, cyano and ether groups and halogen, and A represents a member selected from the group consisting of oxygen, sulfur atom and groups of the formulae, —OCOR', —OR', and SR' wherein R' has the same meaning as R defined above, (4) tetravalent organotin compounds of the formula,

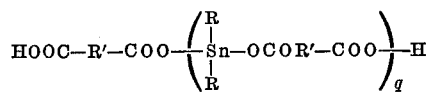

wherein $q$ is an integer of from 1 to 50, R which may be the same or different represents alkyl, alkenyl, aryl and aralkyl groups having from 1 to 20 carbon atoms, whose one or more hydrogen atoms may be substituted by a member selected from the group consisting of hydroxy, carbonyl, ester, ether, nitro and cyano groups and halogen, and R' represents alkylene, alkenylene and arylene groups having from 1 to 15 carbon atoms, and (5) tetravalent organotin compounds of the formula,

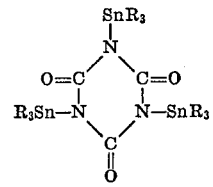

wherein R which may be the same or different represents alkyl, aryl, alkenyl and aralkyl groups having from 1 to 20 carbon atoms, whose one or more hydrogen atoms may be substituted by a member selected from the group consisting of hydroxy, carbonyl, nitro, cyano and ether groups and halogen.

BACKGROUND OF THE INVENTION

(1) Field of the invention

The present invention relates to the polymerization of formaldehyde, and, more particularly, it relates to a process for polymerizing formaldehyde for the production of polyoxymethylene having excellent physical and mechanical properties.

(2) Description of the prior art

In the past, the polymerization of formaldehyde was studied by Staudinger et al. and there have been known various types of polyoxymethylenes. Later, MacDonald proposed a process for the production of polyoxymethylene having an excellent thermal stability and a high degree of toughness by polymerizing a substantially anhydrous formaldehyde in the presence of a certain specific type of catalyst under such reaction conditions permitting the formaldehyde to continuously polymerize as the monomer is introduced, as disclosed in U.S. Pat. No. 2,768,994.

Furthermore, there have been made a number of proposals with regard to the polymerization of formaldehyde and equipment used therefor, for example, as in U.S. Pat. No. 3,172,736. However, in general, in the polymerization of formaldehyde, the build up of scale on the inner surfaces of a reactor, a gas outlet tube and on an agitator is so drastic that the continuation of the polymerization reaction becomes impossible in a short period of time, and no way of resolving the problem has been known heretofore.

SUMMARY OF THE INVENTION

It is, accordingly, an object of the present invention to provide a process for the preparation of polyoxymethylene without being accompanied by the disadvantages of the prior art processes mentioned above, particularly, free from scaling.

The present invention has its basis on a novel finding achieved by the present inventors that a polyoxymethylene may be obtained in the form of a concentrated slurry free from the deposition of scale by blowing a gas stream comprising substantially a monomeric formaldehyde into a polymerization medium containing a specific catalyst below the liquid level thereof to effect the polymerization reaction.

The gas stream substantially comprises a gaseous formaldehyde and it may contain small amounts of water and inert solvents which are inevitably intermixed at the time of preparing the gas and depending upon the operating conditions.

The features of the present invention are as follows:

(1) There is no necessity of adjusting the rate of supplying a monomeric formaldehyde so as to coincide with the rate of polymerization.

(2) A polymerization temperature higher than those employed in conventional processes can be used. In general, a temperature of not higher than 90° C. and not higher than the boiling point of the polymerization medium used is preferred.

(3) A polymer having a high bulk density can be obtained in the form of a highly concentrated polymer slurry. Polymers obtained in the spontaneous-absorption polymerization process referred to hereinbefore usually have a bulk density ranging from 0.05 to 0.3, whereas in the present invention a polymer having a bulk density of higher than 0.4 may be obtained.

(4) Formation and deposition of scale are minimal. In the present invention, since the product polymer is formed in the form of fine spherical or ellipsoidal particles or aggregates thereof, there occurs practically no formation of scale due to aggregation of particles. In the conventional polymerization processes known heretofore, the product polymers are obtained in the form of amoebic irregular granules or aggregates thereof which form bulky scales as a result of aggregation.

(5) A polymerization equipment having no void space can be designed and operated. In the presence of a specific catalyst described hereinafter used in the present invention, all of the monomeric formaldehyde blown into a polymerization medium is immediately polymerized and thus there exists no void space in the reaction vessel. By employing polymerization equipment having no void space, the deposition of scale can be remarkably reduced.

(6) The degree of polymerization may be adjusted by varying the amount of catalyst used. In the conventional polymerization using free cation or free anion catalysts, since the chain termination or chain transfer is dominated by the presence of impurities, the adjustment of the degree of polymerization is achieved by controlling the amounts of impurities being present in the polymerization system as seen in U.S. Pat. No. 3,017,389 or British Pat. No. 796,862.

However, in the present invention, the degree of polymerization of the resulting polymer is dependent upon the amount of catalyst being present in the polymerization system and the amount of monomer supplied. Thus, the adjustment of the degree of polymerization can be achieved by varying the amount of catalyst supplied, bringing about great convenience from the industrial standpoint.

Thus, the present invention is a process for obtaining a polyoxymethylene having a bulk density of higher than 0.4 by blowing a gaseous monomeric formaldehyde into a polymerization medium containing a catalyst described hereinafter, below the liquid level of the polymerization medium without being accompanied by the formation of scale.

Formaldehyde which may be used in the present invention as a monomer is a substantially purified formaldehyde.

Reaction media which may be used in the present invention are organic compounds which are inert to formaldehyde and are liquids at the polymerization temperature, and most preferably those having a low solubility of water therein. Thus, preferable reaction media include, for example, hydrocarbons, ethers, nitriles, ketones and esters, either alone or in admixture with others, and, inter alia, aliphatic hydrocarbons are preferred.

Polymerization catalysts which may be used in the present invention are organotin (IV) compounds represented by the following general Formulae 1–5:

(1) Tetravalent organotin compounds of the general formula,

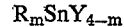

wherein $m$ is an integer of from 1 to 3, R which may be the same or different represents alkyl, alkenyl, aryl and aralkyl groups having from 1 to 20 carbon atoms, whose one or more hydrogen atoms may be substituted by a member selected from the group consisting of hydroxy, carbonyl, ester, nitro, cyano, ether groups and halogen, and Y which may be the same or different represents groups of the general formulae,

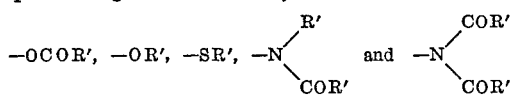

wherein R' has the same meaning as R defined above. However, when Y is the group

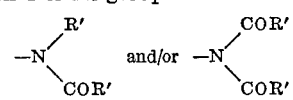

$m$ is not 1.

(2) Tetravalent organotin compounds of the general formula,

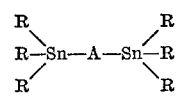

wherein R which may be the same or different represents alkyl, alkenyl, aryl and aralkyl groups having from 1 to 20 carbon atoms, whose one or more hydrogen atoms may be substituted by a member selected from the group consisting of hydroxy, carbonyl, ester, nitro, cyano and ether groups and halogen, and A represents oxygen or sulfur atom or a group of the formula,

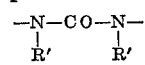

wherein R' has the same meaning as R defined above.

(3) Tetravalent organotin compounds of the general formula,

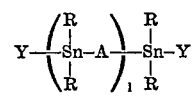

wherein $l$ is an integer of from 1 to 100, R which may be the same or different represents alkyl, alkenyl, aryl and aralkyl groups having from 1 to 20 carbon atoms, whose one or more hydrogen atoms may be substituted by a member selected from the group consisting of hydroxy, carbonyl, ester, nitro, cyano and ether groups and halogen, and A represents an oxygen or sulfur atom and Y represents groups of the formula —OCOR', —OR' and SR' wherein R' has the same meaning as R defined above.

(4) Tetravalent organotin compounds of the formula,

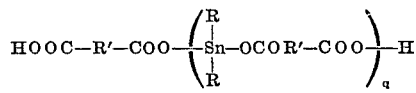

wherein $q$ is an integer of from 1 to 50, R which may be the same or different represents alkyl, alkenyl, aryl and aralkyl groups having from 1 to 20 carbon atoms, whose one or more hydrogen atoms may be substituted by a member selected from the group consisting of hydroxy, carbonyl, ester, ether, nitro and cyano groups and halogen, and R' represents alkylene, alkenylene and arylene groups having from 1 to 15 carbon atoms.

(5) Tetravalent organotin compounds of the formula,

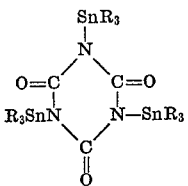

wherein R which may be the same or different represents alkyl, aryl, alkenyl and aralkyl groups having from 1 to 20 carbon atoms, whose one or more hydrogen atoms may be substituted by a member selected from the group consisting of hydroxy, carbonyl, nitro, cyano and ether groups and halogen.

Examples of these tetravalent organotin compounds illustrated by the general formulae include the following compounds:

(1) Examples of $R_mSnY_{4-m}$:

trimethyltin acetate,
diethyltin diacetate,
di-n-butyltin diacetate,
di-ethyltin dipropionate,
triethyltin-n-butylate,
dimethyltin maleate,
di-n-butyltin maleate,
di-n-butyltin dilaurate,
di-n-butyltin distearate,
di-n-butyltin diacrylate,
di-n-octyltin diformate,
di-n-dodecyltin dilaurate,
di-pentadecyltin dipalmitate,
tributyltin isovalerate,
trioctyltin acetate,
di-n-butyltin disalicylate,
diethyltin dibenzoate,
di-n-butyltin dicinnamate,
diphenyltin diacetate,
di-α-chlorooctyltin dilaurate,
di-β-cyanoethyltin di-n-propionate,
tri-β-hydroxyethyltin acetate,
tri-β-methoxycarbonylethyltin benzoate,
tri-benzyltin benzoate,
diethyltin di-α-chloroacetate,
di-n-butyltin di-β-hydroxypropionate,
di-iso-propyltin di-γ-methoxy-n-butylate,
monoethylmonobutyltin diacetate,
monophenylmonoethyltin dibenzoate,
di-n-butyltin diethoxide,
di-n-octyltin di-n-butoxide,
tri-n-dodecyltin pheoxide,
di-n-butyltin monomethoxymonolaurate,
tri-n-octyltin-p-chlorophenoxide,
di-cyclohexyltin dimethoxide,
di-cyclopentyltin diphenylethoxide,
di-n-octyltin dihexahydrobenzoate,
di-decyltin di-p-nitrobenzoate,
tri-p-chlorobenzyltin γ-methoxypropoxide,
di-pentadecyltin di-β-cyanoethoxide,
trimethyltin n-butylmercaptide,
di-n-butyltin di-methylmercaptide,
di-n-butyltin dilaurylmercaptide,
di-ethylmonobutyltin phenylmercaptide,
diethyltin dimethylacrylate,
di-n-propenyltin diacetate,
di-n-butyltin di-β-chloroethylthioglycolate,
di-n-pentyltin monomethoxymethylmaleate, di-n-butyltin monoacetylmonolaurylmercaptide,
trioctadecyltin methylmercaptide,
n-octyltin triphenylmercaptide,
di-n-butyltin-SS'bis(n-octadecylmercaptoacetate),
di-n-butyltin-SS'-bis(mercaptoethylbenzoate),
trimethyltin-N-methyl acetamide,
tributyltin-N-methyl acetamide,
trioctyltin-N-phenyl acetamide,
tripentadecyltin-N-cyclohexyl butylamide,
tributyltin-N-ethyl benzamide,
N-trimethyltin succinimide,
N-tributyltin phthalimide,
dimethyltin-NN-diethyl acetamide and
tri(B-cyano)ethyltin-N-ethyl acetamide.

(2) Examples of

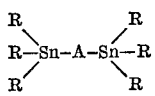

bis(tri-n-propyltin) oxide,
bis(tri-n-butyltin) oxide,
bis(tri-n-octyltin) oxide,
bis(tri-phenyltin) oxide,
bis(tri-pentadecyltin) oxide,
bis(tri-cyclohexyltin) oxide,
bis(tri-γ-cyanopropyltin) oxide,
bis(tri-p-hydroxybenzyltin) oxide,
bis(tri-isopropyltin) sulfide,
bis(tri-n-butyltin) sulfide,
bis(tri-n-octyltin) sulfide,
bis(tri-isovaleryltin) sulfide,
bis(tri-hexadecyltin) sulfide,
bis(tri-phenyltin) sulfide,
bis(tri-β-chloroethyltin) sulfide,
bis(tri-γ-butoxypropyltin) sulfide,
bis-trimethyltin-NN'dimethyl urea and
bis-triphenyltin-NN'diphenyl urea.

(3) Examples of

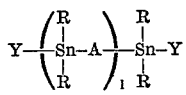

Those in which $l$ is 1:

tetramethyl-1,3-diacetoxy distannoxane,
tetra-n-butyl-1,3-diacetoxy distannoxane,
tetra-n-hexyl-1,3-diacetoxy distannoxane,
tetramethyl-1,3-dipropionyloxy distannoxane,
tetraphenyl-1,3-dipropionyloxy distannoxane,
tetramethyl-1,3-dilauroyloxy distannoxane,
tetra-n-octyl-1,3-distearyloxy distannoxane,
tetrabenzyl-1,3-dilauroxy distannoxane,
tetra-dodecyl-1,3-diacetoxy distannoxane,
tetra-methyl-1,3-didecanoyloxy distannoxane,
tetra-methyl-1-acetoxy-3-propionyloxy distannoxane,
1,1-dimethyl-3,3-di-n-butyl-1-acetoxy-3-butyroloxy-
  distannoxane,
tetra(β-cyanoethyl)-1,3-diacetoxy distannoxane,
tetra(β-hydroxyethyl)-1,3-dibutyryloxy distannoxane,
tetra(β-ethoxyethyl)-1,3-diformyloxy distannoxane,
tetramethyl-1,3-dimethoxy distannoxane,
tetra-n-butyl-1,3-diisopropoxy distannoxane,
tetraallyl-1,3-diethoxy distannoxane,
tetracyclohexyl-1,3-diacetoxy distannoxane,
tetra-dodecyl-1,3-dipropoxy distannoxane,
tetra-n-butyl-1,3-di(γ-cyanopropioxy) distannoxane,
tetramethyl-1,3-diethylmercaptodistannoxone,
tetra-n-butyl-1,3-dibenzylmercaptodistannoxane,
bis(dimethylacetoxytin) sulfide,
bis(dimethyl-butyryloxytin) sulfide,
bis(dimethylmethoxytin) sulfide,
bis(dibutyllauroyloxytin) sulfide.

Those in which $l$ is $n$, include, poly stannanediol dilaurate (Adrastab-7–12), poly stannanediol dipalmitate, poly stannanediol dimethylether, poly stannanediol dibutylether, poly stannanediol didodecylmercaptide, poly stannanethiol diooctylether.

(4) Examples of

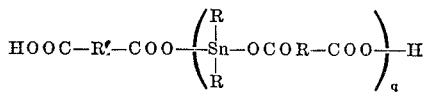

poly di-n-butyltin sebacate,
poly di-n-butyltin adipate,
poly di-n-butyltin maleate,
poly di-ethyltin sebacate,
poly di-ethyltin succinate,
poly di-n-propyltin azealate,
poly di-butyltin 1,13-tridecanedicarboxylic acidester.

(5) Examples of

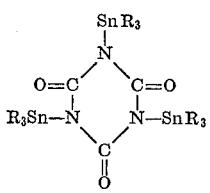

1,3,5-tributyltin-S-triazin-2,4,6-trione,
1,3,5-triethyltin-S-triazin-2,4,6-trione,
1,3,5-triphenyltin-S-triazin-2,4,6-trione,
tribenzyltin-N-methyl acetamide,
N-tri($\beta$-methoxyethyl)tin succinimide.

The amounts of tetravalent organotin compounds which may be used as a catalyst in the process of the present invention may be varied in a wide range. While the amount to be used depends upon the type of catalyst, reaction conditions and molecular weight of the polymer contemplated, in general, it preferably ranges from 0.00001 to 1.0 mol percent based on monomeric formaldehyde, and most preferably from 0.0001 to 0.3 mol percent on the same basis.

In the process of the present invention, a polymerization temperature not higher than the ceiling temperature of formaldehyde which is 127° C. may be conveniently employed. In general, a temperature of from 30 to 90° C. is preferred.

In the proces of the present invention, a gaseous monomeric formaldehyde is introduced into and below the liquid level of a polymerization medium containing a polymerization catalyst with a pressure higher than the reactor head pressure, and the gaseous formaldehyde in the nozzle should be maintained at a temperature above the ceiling temperature so as to prevent the polymerization within the inlet tube.

Adhering of scale on the nozzle can be prevented by blowing in the gas under pressure.

Normally, a polyoxymethylene obtained by the polymerization of formaldehyde as such has a quite poor thermal stability and it cannot be used as plastics for practical purposes as it is. Thus, in general, the terminal hydroxy groups of the polymer are capped by esterifying them with an esterification agent or etherifying them with an etherification agent for preventing degradation from those terminal hydroxy groups. And, usually, a thermal stabilizer, an antixodant and other additives are incorporated into the polymer.

Polyoxymethylene prepared according to the process of the present invention differs from polyoxymethylenes having excellent thermal stability and toughness obtained according to the process proposed by MacDonald referred to hereinbefore. It also does not belong to any of polyoxymethylenes described by Staudinger. More specifically, polyoxymethylene obtained according to the process of the present invention has a quite poor thermal stability and it is easily decomposed by heating to be gasified. The toughness is so low that it is difficultly formed into a film. Even though a film is obtained therefrom, the film is brittle and weak. Thus, according to the knowledge of the prior art, such a polyoxymethylene does not appear to endure the stabilizing treatment of the terminal groups thereof.

However, quite unexpectedly, it has been found that the polyoxymethylene of poor properties obtained in the presence of the catalyst of the present invention can be thermally stabilized quite easily by the esterification or etherification of the terminal groups thereof and there can be obtained an end capped polymer having much better thermal stability than those of polyoxymethylenes obtained by using a catalyst of organic compounds known heretofore.

In accordance with the present invention, the product polyoxymethylene is obtained in the form of a slurry of fine ellipsoidal or spherical granules having a regularity, whereas in the prior art processes using conventional free anionic catalysers known heretofore such as, e.g. tertiary amines and isonitriles, the product polyoxymethylene grows as polymer having an amoebic irregular structure, as described above.

It is presumed that due to the difference in the morphological structures between the polyoxymethylene obtained according to the present invention and those obtained in the prior art processes, the deposition of scale on the reactor interior wall can be successfully minimized in the process of the present invention while the prior art processes are accompanied by this inconvenience.

Although no particular restriction is imposed on the designing of equipment to be employed for practising the process of the present invention, it is recommendable in general to provide at the bottom of a polymerization vessel a suitable nozzle means adapted to blow in a gaseous monomeric formaldehyde therethrough. However, in this instance, a precaution should be taken that the depth of the nozzle means below the liquid level in the polymerization vessel should be such that warrants a sufficient contact between a gaseous monomeric formaldehyde and a catalyst in the polymerization medium to ensure a satisfactory polymerization of the monomer in the meantime.

To accomplish this, in general, it is desirable that the depth of the nozzle means is deep enough so that no unreacted gas appears above the liquid level. When using a conventional organic tertiary amine as a catalyst, a lot of unreacted formaldehyde would be exhausted from the reactor and be scaled markedly on the interior surface of the vessel, even if the same reactor and the same operational conditions were used.

The process of the present invention may be carried out either continuously or batch-wise. When carrying out the process continuously, the catalyst and medium are replenished externally.

If a suitable depth of the liquid reaction zone is provided and the blowing of a monomeric formaldehyde is effected with proper amount and pressure, it is possible to obtain the polymer contemplated in the present invention.

In the process of the present invention, the inconveniences mentioned above are successfully eliminated by filling the vessel wholly with a polymerization medium. That is, the formation of scale can be prevented by filling the polymerization vessel with a polymerization medium up to the top.

The polymerization vessel having no void space can be adopted only when the specific catalyst of the present invention is employed and the use of such a polymerization vessel is not feasible when conventional catalysts such as organic basic catalysts such as amines or free anionic catalysts are used. The resulting polymer is discharged from the system in the form of a slurry.

If the polymerization is carried out using a catalyst other than the catalyst of the present invention, for example, a tert-amine, according to the process of the present invention, there would be obtained a polymer having a low bulk density with the formation of large amounts of scale. Similarly, if the polymerization is carried out using the catalyst of the present invention but in accordance with conventional processes known heretofore other than the process of the present invention, there would be a drastic adhesion of scale in the reactor, though there may be obtained a polymer having a bulk density of about 0.3–0.4. Thus, in the commercial production of polyoxymethylenes, the special combination of the catalyst and the polymerization process as in the present invention is required.

The removal of heat of polymerization can be conveniently accomplished according to the conventional means, for example, by cooling a water jacket of the polymerization vessel or inserting a cooling coil therein, or by circulating the slurry through an external heat exchanger, or by evaporating a part of the slurry to effect cooling, utilizing the latent heat of evaporation.

In a preferred embodiment of the process of the present invention, a vertical-type polymerization vessel is filled with a polymerization medium up to a sufficient height and a gaseous monomeric formaldehyde is blown thereinto from the bottom with or without agitation. While maintaining such conditions under which a polymer formed and suspended in the polymerization medium is present only in the lower part of the vessel and substantially absent in the upper part thereof, a part of the upper liquid layer is withdrawn from the vessel for recycling to the lower part of the vessel through a cooling means, while the resulting polymer slurry is withdrawn from the bottom of the vessel.

Polyoxymethylene obtained according to the present invention has a bulk density of higher than 0.4 as measured according to ASTM D–1895–61T(A). Since those polyoxymethylenes obtained in the prior art processes normally are 0.05–0.3 or thereabout, there is a difference in terms of a bulkiness of as much as 2 to 8 times between the polyoxymethylene of the present invention and those of the prior art.

Thus, the amount of polymerization medium required in the process of the present invention for a given polymer concentration in terms of weight ratio is about one half to one-eighth of that required in the prior art process, and the separation of solid and liquid from each other can be achieved much easier.

The polymer obtained according to the present invention may be used as compounded composition for the production of shaped articles, films, fibers, rods, sheets, pipes and the like by effecting the protection of the terminal groups by esterification using, e.g., acid anhydrides, ketenes and α-cyanovinyl acetate, or etherification using, e.g., orthoester and formate, and, if required, purifying by washing, incorporating and dispersing uniformly therein such additives as antioxidants, thermal stabilizers, antistatics and lubricants.

DESCRIPTION OF PREFERRED EMBODIMENTS

The following examples will serve to illustrate the present invention more fully. It should not be construed, however, that these examples will restrict the present invention in any way as they are given merely by way of illustration.

Definitions of terms referred to in the examples described hereinafter are as follows:

(1) Conversion of polymerization

Conversion of blown monomeric formaldehyde gas to the product polymer in terms of percentage by weight.

(2) Bulk density

Abbreviated as B.D. measured according to ASTM D–1895–61A(A)

(3) Reduced viscosity

Referred to as $\eta$ sp./c. Measured by dissolving 0.5% by weight of a polymer in a mixed solution containing p-chlorophenol and tetrachloroethane in a ratio of 1:1 by weight at 60° C.

(4) Sulfite soluble fraction

Referred to "fr." Soluble portion in terms of percentage when immersing a polymer into as much as 50 times the weight of the polymer of a mol aqueous solution of sodium sulfite. The values show the molecular weight distribution of the polymer.

(5) Thermal decomposition constant

Referred to as "$K_{222}$, percent/min." Values obtained by measuring the amount of decrease of the polymer weight due to decomposition at 222° C. under a reduced pressure.

(6) Polymerization system (I) Process according to "spontaneous absorption polymerization".—In the instant system, to a 26 liters capacity polymerization vessel is charged 22 liters of a polymerization medium having a catalyst dissolved therein and a gaseous monomeric formaldehyde is introduced into the void space of the vessel at a rate of 1 kg. per an hour with agitation at 200 r.p.m. Unreacted gas is discarded out of the system via a seal pot and the product polymer slurry is withdrawn from the system while continuously supplying a catalyst solution to the polymerization vessel at a rate of 6 liters per an hour. The resulting polymer is filtered off and dried to give a polymer sample.

(II) Present process-1.—To a 26 liters capacity polymerization vessel is charged 22 liters of a polymerization medium having catalyst dissolved therein and a gaseous monomeric formaldehyde is blown thereinto through a nozzle provided at the bottom of the vessel at a rate of 1 kg. per an hour with a pressure of 2.0 kg./cm.$^2$G under agitation at 200 r.p.m. The product polymer slurry is withdrawn from the system while supplying a catalyst solution to the polymerization vessel at a rate of 6 liters per an hour. The resulting polymer slurry was filtered off and dried to give a sample polymer.

(III) Present process-2.—Procedures are the same as in present process-1 described above except that the 26 liter capacity polymerization vessel was filled with 26 liters of the polymerization so as not to leave a void space in the vessel.

(7) Acetylating process

There are mixed 100% by weight of acetic anhydride, 130% by weight of n-hexane and 0.1% by weight of sodium acetate based on the weight of the polymer, respectively, and the reaction is carried out in an autoclave at 155° C. ±1° C. for 90 minutes. After the reaction, the reaction product was filtered off and washed once with 10 volumes per volume of polymer cake of acetone and further washed twice with 10 volumes on the same basis of water, followed by drying.

Example 1.—Polymerization reaction was carried out according to the procedures of the polymerization system (II) by blowing a gaseous formaldehyde having a purity of 99.8% into a polymerization medium prepared by dissolving di-n-butyltin dilaurate in n-hexane in a concentration of 0.08 g./l. at 40° C. continuously for 100 hours.

After the completion of the reaction, the condition of scale in the polymerization vessel was carefully examined. As a result, it was found that the condition on the portion where filled with the liquid clearly differed from that of the void portion. To be more specific, there was seen practically no deposition of scale on the liquid filled portion. However, a thin layer of scale was partly formed in a thickness of about 0.3 mm., while that of the gaseous phase portion was a coarse and brittle one having a thickness of 5–10 mm.

The resulting polymer was in the form of granules having a particle size ranging from 150 to 300$\mu$ and it was found as a result of examination using a scanning-type microscope (10,000 power) that the granules were aggregates of fine particles as shown in FIG. 1.

The resulting polymer had a B.D. of 0.68, average, a $\eta_{sp./c.}$ of 2.6, average and a fr. of 5.4, average. The conversion of polymerization was practically 100%.

The polymer obtained as such had a $K_{222}$ of 18.3%/min. and after the acetylation treatment it turned to 0.03%/min. The acetylated polymer was examined according to a continuous eluting test and it was found to have a narrow molecular weight distribution.

Example 2 (Comparative).—Polymerization reaction was carried out according to the same procedures and under the same conditions as described in Example 1 except that a polymerization medium prepared by dissolving tri-n-butylamine in n-hexane in a concentration of 1.0 g./l. was used.

After the reaction, there was formed on the liquid phase portion of the polymerization vessel felt-like scale having a thickness of about 3–5 mm. On the gaseous phase portion was there formed hard, coarse and brittle scale having a thickness of 50–60 mm.

The resulting polymer was amorphous and as a result of examination using a scanning-type microscope (10,000 power) it was found that the polymer had an amoebic irregular configuration, as shown in FIG. 2.

The polymer had a B.D. of 0.23, average, a $\eta_{sp./c.}$ of 1.2, average and a fr. of 38.8, average. The conversion of polymerization was 85%. The polymer obtained as such had a $K_{222}$ of 0.65%/min. and after the acetylation it was 0.14%/min.

Example 3.—Polymerization reaction was carried out by blowing a gaseous monomeric formaldehyde having a purity of 99.9% into a polymerization medium prepared by dissolving tetramethyl-1,3-diacetoxy distannoxane in n-heptane in a concentration of 1.02 g./l. at 55° C. continuously for 30 hours.

Condition of the deposition of scale in the polymerization vessel after the reaction was such that the scale on the liquid phase portion had a thickness of less than 0.1 mm., while hard and irregular scale of about 10–20 mm. thickness covered all over the gaseous phase portion of the vessel.

The resulting polymer was obtained in the form of granules having a particle size ranging from 100 to 200$\mu$, and it had a B.D. of 0.50, average, a $\eta_{sp./c.}$ of 2.77, average and a fr. of 2.1. The conversion of polymerization was 91%. The polymer obtained as such had a $K_{222}$ of 28.6%/min. and after the acetylation, the value was 0.03%/min.

Example 4 (Comparative).—Polymerization reaction was carried out according to the spontaneous absorption polymerization process at 30° C. using a gaseous monomeric formaldehyde having a purity of 99.9% and a n-hexane solution containing triethylamine in a concentration of 0.55 g./l. as a polymerization medium.

In 5 hours after the starting of the reaction, clogging of the exhaust pipe occurred several times and, finally, after the lapse of 6.5 hours, any further continuation of the operation became impossible.

Examination of the inside of the polymerization vessel revealed that there was a drastic formation of scale on the gaseous phase portion and the exhaust pipe was completely clogged. Soft scale having a thickness of about 3 mm. was formed on the wall of liquid phase portion of the vessel. The conversion of polymerization was 31%. The resulting polymer was obtained in the fibrous form and it had a B.D. of 0.08, a $\eta_{sp./c.}$ of 2.4 and a fr. of 7.27. The polymer obtained as such had a $K_{222}$ of 0.33 and after the acetylation the value was 0.08.

Example 5.—Polymerization reaction was carried out according to the procedures of the polymerization system (III), blowing a gaseous monomeric formaldehyde having a purity of 99.7% into a polymerization medium of a cyclohexane solution containing dibutyltin dimaleate in a concentration of 0.10 g./l. at 50° C. for 200 hours.

Examination of the inside of the polymerization vessel revealed the formation of a film-like hard scale having a thickness of about 0.2–0.3 mm. nearly uniformly on the inside wall surface of the vessel.

The resulting polymer was obtained in the form of granules having a particle size ranging from 100 to 300$\mu$, and it had a B.D. of 0.59, average, a $\eta_{sp./c.}$ of 2.4, average and a fr. of 12.6, average. The conversion of polymerization was nearly 100%.

Example 6.—Polymerization reaction was carried out according to the same procedures and under the same reaction conditions as described in Example 1 except that a polymerization prepared by dissolving bis(tri-n-butyltin) oxide in n-heptane in a concentration of 0.1 g./l. was used.

The resulting polymer was obtained in the form of granules having a particle size ranging from 100 to 300$\mu$, and it had a B.D. of 0.63, average, a $\eta_{sp./c.}$ of 22, average, and a fr. of 7.8, average.

Example 7.—Polymerization reaction was carried out according to the procedures of the polymerization system (III) by blowing a gaseous monomeric formaldehyde having a purity of 96.6% into a polymerization medium prepared by dissolving tri-butyltin-laurate in n-hexane in a concentration of 0.02 g./l. at 30° C. for 30 hours. The conversion of polymerization was nearly 100%.

The resulting polymer was obtained in the form of fine granules having a particle size ranging from 30 to 150$\mu$, and it had a B.D. of 0.48, average, and a $\eta_{sp./c.}$ of 1.76, average.

Examples 8–21.—Results obtained in the polymerization reactions conducted using a gaseous monomeric formaldehyde having a purity of 99.8% under various reaction conditions are tabulated altogether in the following table. Properties shown were obtained with regard to sample polymers prepared by filtering off the polymer slurry after continuous reaction of 6 hours followed by drying.

TABLE

| No. | Catalyst | Concentration of catalyst (g./l.) | Polymerization system | Solvent | Polymerization temperature (° C.) | Polymerization yield, percent | Bulk density | $\eta_{sp./c.}$ | Fr. | Shape of polymer |
|---|---|---|---|---|---|---|---|---|---|---|
| 8 | Tri-n-butylamine | 1.0 | I | n-Heptane | 55 | 62 | 0.21 | 0.21 | 93.6 | Amorphous |
| 9 |  | 1.0 | II | do | 55 | 85 | 0.31 | 0.32 | 92.1 | Do. |
| 10 |  | 1.0 | III | do | 55 | 92 | 0.30 | 0.28 | 96.3 | Do. |
| 11 | Tetramethyl-1,3-dipropionoxy distannoxane | 0.02 | II | n-Heptane | 55 | ~100 | 0.65 | 2.31 | 4.2 | Granule |
| 12 |  | 0.02 | III | do | 55 | ~100 | 0.67 | 2.46 | 3.3 | Do. |
| 13 | Poly di-n-butyltin sebacate | 0.08 | II | n-Hexane | 45 | 100 | 0.59 | 3.12 | 5.6 | Granule |
| 14 | 1,3,5-triethyltin-S-triazine-2,4,6-trione | 0.08 | II | do | 45 | ~100 | 0.52 | 2.83 | 3.1 | Do. |
| 15 | Diethyltin dibenzoate | 0.30 | I | n-Hexane | 40 | 85 | 0.29 | 3.05 | 10.8 | Amorphous |
| 16 |  | 0.30 | III | do | 40 | ~100 | 0.61 | 2.73 | 6.5 | Granule |
| 17 | Di-n-butyltin dilaurate | 0.08 | I | Toluene 1, n-Heptane 1 | 55 | 93 | 0.28 | 2.20 | 17.6 | Amorphous |
| 18 |  | 0.08 | II | n-Heptane | 55 | ~100 | 0.47 | 2.34 | 11.3 | Granule |
| 19 | N-tributyltin succinimide | 0.08 | II | n-Hexane | 40 | ~100 | 0.51 | 1.96 | 8.1 | Granule |
| 20 | Bis (triphenyltin)-N,N'-diphenylurea | 0.6 | II | do | 40 | ~100 | 0.57 | 2.37 | | Do. |
| 21 | Dibutyltin-dimethylmercaptide | 0.20 | II | do | 40 | ~100 | 0.58 | 2.12 | 12.3 | Do. |

Example 22.—To a 120 liter capacity polymerization vessel measuring 400 mm. diameter and 1000 mm. height was charged 120 liters of a polymerization medium prepared by dissolving di-n-butyltin-dilaurate in n-heptane in a concentration of 0.10 g./l. in such a manner that no void space was left therein, and a gaseous monomeric formaldehyde having a purity of 99.9% was blown thereinto through a nozzle provided at the bottom of the vessel at a rate of 6 kg. per an hour with a pressure of 2.0 kg./cm.$^2$ G under agitation at 250 r.p.m.

The resulting polymer slurry having a concentration of solid component of 40% by weight was continuously withdrawn from the system, while continuously supplying a catalyst solution to the system at a rate of 15 kg. per an hour.

The resulting slurry was filtered off and dried to yield a polymer, a part of which was taken as a sample polymer.

Examination of the insides of the polymerization vessel indicated that a hard film-like scale was formed on the inner wall surface in a thickness of from 0.5 to 0.6 mm. The scale was formed nearly uniformly inside the vessel and the thickness thereof at the agitator blades was quite thin.

The resulting polymer had a B.D. of 0.67, average, a $\eta_{sp./c.}$ of 2.3, average, and an fr. of 3.9, average. The polymer was in the form of granules having a particle size ranging from 170 to 400μ. The conversion of polymerization was nearly 100%.

Example 23.—A 350 liter capacity polymerization vessel measuring 700 mm. diameter and 1,000 mm. height was filled with 280 liters of a n-hexane solution containing tetramethyl-1,3-diacetoxy distannoxane in a concentration of 0.01 g./l. as a polymerization medium.

Polymerization was carried out by blowing a gaseous monomeric formaldehyde having a purity of 99.7% into the polymerization medium from a specially designed nozzle provided at the bottom of the polymerization vessel with a pressure of 0.5 kg./cm.$^2$ G at a rate of 6 kg. per an hour.

The resulting polymer slurry having a concentration of solid component of 40% by weight was continuously withdrawn from the system, while continuously supplying a catalyst solution to the system at a rate of 15 kg. per an hour.

The slurry thus withdrawn was filtered off and dried to yield a polymer, a part of which was taken as a sample polymer. The polymerization reaction was carried out at 45° C. continuously for 35 hours.

Examination of the insides of the polymerization vessel after the completion of the reaction revealed that there was formed hard, brittle and coarse scale on the gaseous phase portion in a thickness of about 10 mm. On the liquid phase portion of the vessel, there was formed a film-like scale in a thickness of 0.6–0.8 mm.

The resulting polymer had a B.D. of 0.65, average, a $\eta_{sp./c.}$ of 2.5, average, and an fr. of 4.5, average. The polymer was in the form of granules, more than 85% of which having a particle size ranging from 150–300μ. The conversion of polymerization was nearly 100%.

To a part of the resultant slurry were added 100% by weight of acetic anhydride and 0.1% by weight of sodium acetate based on the weight of the polymer, respectively, and the mixture was reacted in an autoclave at 156° C. for 30 minutes, then, washed with water followed by drying. The polymer thus obtained had a $K_{222}$ of 0.03%/min.

Example 24.—A polymerization vessel measuring 200 mm. diameter and 2,000 mm. height, provided with an agitator and a blowing nozzle at the bottom and further provided with a piping connecting the upper part and the bottom part of the vessel via a cooling device for recycling the reaction mixture therethrough, was filled with a n-hexane solution containing 0.60% by weight of di-n-butyltin dilaurate without leaving any void space therein.

Polymerization reaction was carried out by blowing a gaseous monomeric formaldehyde thereinto through the blowing nozzle with a pressure of 2.0 kg./cm.$^2$ G at a rate of 1.0 kg./hr.

A part of an upper layer of the reaction mixture was withdrawn, cooled and recycled to the lower part of the vessel so as to maintain the temperature of the vessel at 55° C.

When the concentration of solid component of the reaction mixture reached 40% by weight, the polymer slurry was withdrawn from the bottom, while supplying a catalyst solution to the reaction system at such a rate that the amount of catalyst was 0.07 mol percent based on formaldehyde supplied.

The polymerization system reached a steady state after 12 hours from the start of the reaction. A polyoxymethylene having a bulk density of 0.70, an intrinsic viscosity of 2.70, an average particle size of 130μ and a rate of precipitation of 32 m./hr. was obtained. There was present practically no polymer in the upper layer liquid. The polymerization reaction was further carried out for 60 hours and the experiment was quite satisfactorily terminated.

To the polyoxymethylene slurry were added 100% by weight of acetic anhydride and 0.1% by weight of sodium acetate based on the weight of the polymer, respectively, and the mixture was reacted in an autoclave at 156° C. for 30 minutes, then, filtered and washed once with acetone and further with acetone and water followed by drying to give polyoxymethylene diacetate having a $K_{222}$ of 0.02%/min., capable of affording a tough film.

We claim:
1. Process for polymerizing formaldehyde to a solid polyoxymethylene which comprises blowing a gas stream comprising gaseous formaldehyde into a liquid formaldehyde polymerization medium below the liquid level thereof in such a depth that no unreacted gas appears above the liquid level, said polymerization medium containing a catalyst selected from the group consisting of
(1) tetravalent organotin compounds of the general formula,

wherein $m$ is an integer of from 1 to 3, R which may be the same or different represents alkyl, alkenyl, aryl and aralkyl groups having from 1 to 20 carbon atoms, whose one or more hydrogen atoms may be substituted by a member selected from the group consisting of hydroxy, carbonyl, ester, nitro, cyano, ether groups and halogen, and Y which may be the same or different represents groups of the general formulae,

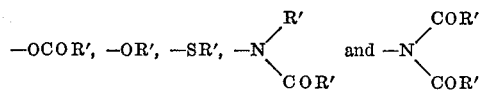

wherein R' has the same meaning as R defined above, however, when Y is the group

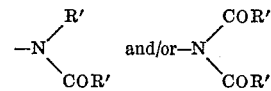

$m$ is not 1,
(2) tetravalent organotin compounds of the general formula,

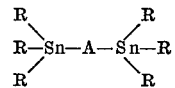

wherein R which may be the same or different represents alkyl, alkenyl, aryl and aralkyl groups having from 1 to 20 carbon atoms, whose one or more hydrogen atoms may be substituted by a member selected from the group consisting of hydroxy, carbonyl, ester, nitro, cyano and ether groups and halogen, and A represents a member selected from the group consisting of oxygen, sulfur atom and a group of the formula,

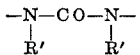

wherein R' has the same meaning as R defined above, (3) tetravalent organotin compounds of the general formula,

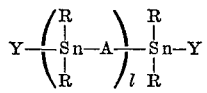

wherein $l$ is an integer of from 1 to 100, R which may be the same or different represents alkyl, alkenyl, aryl and aralkyl groups having from 1 to 20 carbon atoms, whose one or more hydrogen atoms may be substituted by a member selected from the group consisting of hydroxy, carbonyl, ester, nitro, cyano and ether groups and halogen, and A represents a member selected from the group consisting of an oxygen or a sulfur atom and Y represents groups of the formulae, —OCOR', —OR' and SR' wherein R' has the same meaning as R defined above, (4) tetravalent organotin compounds of the formula,

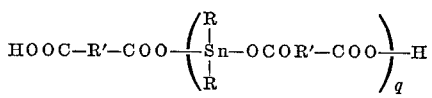

wherein $q$ is an integer of from 1 to 50, R which may be the same or different represents alkyl, alkenyl, aryl and aralkyl groups having from 1 to 20 carbon atoms, whose one or more hydrogen atoms may be substituted by a member selected from the group consisting of hydroxy, carbonyl, ester, ether, nitro and cyano groups and halogen, and R' represents alkylene, alkenylene and arylene groups having from 1 to 15 carbon atoms, and (5) tetravalent organotin compounds of the formula,

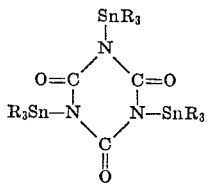

wherein R which may be the same or different represents alkyl, aryl, alkenyl and aralkyl groups having from 1 to 20 carbon atoms, whose one or more hydrogen atoms may be substituted by a member selected from the group consisting of hydroxy, carbonyl, nitro, cyano and ether groups and halogen.

2. Process according to claim 1 wherein said reaction medium is selected from aliphatic hydrocarbons.

3. Process according to claim 1 wherein said polymerization is carried out in a reactor filled with the polymerization medium up to the top.

4. Process according to claim 1 wherein said polymerization medium is recycled through an external heat exchanger for elimination of heat of polymerization.

5. Process according to claim 1 wherein a vertical-type polymerization vessel is filled with a polymerization medium in such a depth that no unreacted gas appears above the liquid level and a gaseous monomeric formaldehyde is blown thereinto from the bottom with or without agitation while maintaining such condition under which a polymer formed and suspended in the polymerization medium is present only in the lower part of the vessel and substantially absent in the upper part thereof, and a part of the upper liquid layer is withdrawn from the vessel for recycling to the lower part of the vessel through a cooling means while the resulting polymer slurry being withdrawn from the bottom of the vessel.

6. Process according to claim 5 wherein said recycled liquid is a slurry containing the resulting polyoxymethylene.

7. Process according to claim 1 wherein said gaseous formaldehyde to be blown into the reactor is heated to not lower than the ceiling temperature of 127° C. for formaldehyde.

8. Process according to claim 1 wherein said catalyst is a tetravalent organotin compound (4).

9. Process according to claim 1, wherein said catalyst is a tetravalent organotin compound (5).

References Cited

UNITED STATES PATENTS

| | | | |
|---|---|---|---|
| 2,848,437 | 8/1958 | Langsdorf et al. | 260—67 FP |
| 3,311,592 | 3/1967 | Wagner et al. | 260—67 FP |
| 3,376,328 | 4/1968 | Davies | 260—67 FP X |
| 3,458,479 | 7/1969 | Lugo et al. | 260—67 FP |
| 3,470,135 | 9/1969 | Ishida et al. | 260—67 FP |

WILLIAM H. SHORT, Primary Examiner

L. M. PHYNES, Assistant Examiner